(12) United States Patent
Dieringer et al.

(10) Patent No.: US 6,578,806 B2
(45) Date of Patent: Jun. 17, 2003

(54) BEVERAGE HOLDER

(75) Inventors: Juergen Dieringer, Herrenzimmmern (DE); Torsten Bieck, Waldachtal (DE); Gunter Leopold, Baiersbronn (DE); Bernd Plocher, Rottenburg (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/209,133

(22) Filed: Jul. 31, 2002

(65) Prior Publication Data

US 2003/0025058 A1 Feb. 6, 2003

(30) Foreign Application Priority Data

Aug. 1, 2001 (DE) .......................................... 101 37 533

(51) Int. Cl.⁷ .................................................. A47K 1/08
(52) U.S. Cl. .................................... 248/311.2; 224/926
(58) Field of Search ....................... 248/311.2; 224/926, 224/281; 297/188.17, 188.15

(56) References Cited

U.S. PATENT DOCUMENTS

| 4,733,908 A | * | 3/1988 | Dykstra et al. | ........ 297/188.16 |
| 5,171,061 A | * | 12/1992 | Marcusen | .............. 297/188.17 |
| 5,259,580 A | | 11/1993 | Anderson et al. | ........ 248/311.2 |

FOREIGN PATENT DOCUMENTS

DE   198 45 930 A1   4/2000

* cited by examiner

*Primary Examiner*—Ramon O. Ramirez
(74) *Attorney, Agent, or Firm*—Michael J. Striker (57) ABSTRACT

A beverage holder for a beverage container for example a can, a cup, or a beaker is provided for installation into a dashboard of a motor vehicle and has a pulled-out portion arranged to be displaceably guided as a drawer and having an insertion opening for a beverage container, wherein the beverage container has a shape of an arc of a circle and is provided with an arcuate slide guide and a support rotatable through 180° for supporting the inserted beverage container securely against tipping over.

10 Claims, 6 Drawing Sheets

BEVERAGE HOLDER

BACKGROUND OF THE INVENTION

The invention relates to a beverage holder.

Such beverage holders are known per se and are provided for installation, for example, in a dashboard of a motor vehicle. The known beverage holders have a pull-out portion that is guided displaceably back and forth in the manner of a drawer, by means of a slide guide, between an inserted position in which it is not in use and an extended in-use position. In the inserted not-in-use position, the pull-out portion is recessed in the dashboard of the motor vehicle and terminates flush with the dashboard, especially by means of a cover panel. In the extended in-use position, the pull-out portion projects from the dashboard. The pull-out portion has one or more insertion openings for the insertion of a beverage holder, which openings, in the extended in-use position of the pull-out portion in which it projects from the dashboard, are accessible and can be used for the insertion of a beverage holder. Beverage holders may be, for example, a drinks can, a cup, beaker or the like.

SUMMARY OF THE INVENTION

Accordingly, it is an object of the present invention to provide a beverage holder which can be adapted to a given installation space in and behind a dashboard.

In keeping with these objects and with others which will become apparent hereinafter, one feature of the present invention resides, briefly stated, in a beverage holder which has a pull-out portion that has an insertion opening for insertion of a beverage holder; a slide guide which guides said pull-out portion displaceable back and forth as a drawer between an inserted non-in-use position and an extended in-use position, said slide guide being formed as a curved guide that displaceably guides said pulled-out portion at a start of an extension movement with a large vertical component and toward an end of the extension movement with an increasingly horizontal component, said pull-out portion including a support having a rotation bearing for a beverage holder inserted in said insertion opening, with an axis of rotation of said rotation beverage bearing having a position selected from a substantially vertical position and a substantially inclined position forward in a direction of extension when said pull-out portion has been extended.

The displacement path of the pull-out portion on extension thereof, starting from the inserted position of the pull-out portion in which it is not in use, extends initially upwards or obliquely upwards. As the extension movement continues, the direction of displacement of the pull-out portion by the curved guide increasingly changes to the horizontal. In this, the direction of displacement does not have to be exclusively horizontal, even when the fully extended in-use position of the pull-out has been reached; instead the direction of displacement of the pull-out portion can also extend at an angle to the horizontal direction even at the end of the extension movement. The terms used to illustrate the invention that define spatial direction, such as "upwards", "horizontal" or "vertical" are to be understood as relative to a proposed installation positions of the beverage holder.

As a result of the curved guide of the pull-out portion according to the invention, the space required for the beverage holder in a notional approximately horizontal plane or in a direction approximately perpendicular to the dashboard in and behind the dashboard is reduced. Of course, there must be available for the beverage holder an installation space that is directed downwards in a curved shape behind the dashboard. By means of its curved guide, the beverage holder according to the invention is adapted to a given installation space behind a dashboard of a motor vehicle.

As a result of the curved guide, the pull-out portion of the beverage holder according to the invention slopes away to the rear, "rear" being intended to mean relative to the extension movement of the pull-out portion. This has the consequence that the height of the insertion opening for the beverage holder in a region of the insertion opening is reduced, "a rear region" being intended to mean a region of the insertion opening face the dashboard in the extended in-use position of the pull-out portion and located to the rear in the direction of extension of the pull-out portion. In order to support an inserted beverage holder reliably and at sufficient height against tipping over, claim 1 provides a support having a rotation bearing for a beverage holder inserted in the insertion opening. The axis of rotation of the rotation bearing in the in-use position of the pull-out portion extends approximately vertically or inclined forwards relative to the vertical in the direction of extension. In order to insert a beverage holder into the insertion opening, the support in a pull-out portion that has been extended to the in-use position is rotated backwards into the rear region of the insertion opening. The backwards-rotated support projects upwards above the pull-out portion and supports a beverage holder inserted in the insertion opening in the rear region of the insertion opening above the pull-out portion. As a result of the backwards-rotated support, the inserted beverage holder is supported and held reliably against tipping over. A further advantage of the rotatable support is that it enables the insertion opening to be widened sideways. As a result of the rotatable support, the diameter of the insertion opening can be increased beyond the width of the pull-out portion.

In accordance with another feature of the present invention, the beverage holder has a pulled-out portion that has an insertion opening for insertion of a beverage holder; a slide guide for guiding said pulled-out portion displaceably back and forth as a drawer between an inserted not-in-use position and an extended in-use position, said slide guide being a curved guide that displaceably guides said pulled-out portion at a start of an extension movement with a large vertical component and toward an end of said extension movement with an increasingly horizontal component, said pulled-out portion including a support that, in a support position, is located in a rear peripheral region of said insertion opening and above said pulled-out portion and is recessed in said pulled-out portion in a non-supporting position.

When the beverage holder is designed in accordance with the present invention it provides a support that can be moved from a non-supporting position to a support position. In the support position, the support is located in the rear portion of the peripheral region fo the insertion opening above the pull-out portion. The support supports a beverage holder inserted in the insertion opening in the rear region of the insertion opening above the pull-out portion, so that the beverage holder inserted in the insertion opening is held securely against tipping over. The support supports a drink container inserted in the insertion opening in that region of its periphery in which the height of the insertion opening in the pull-out portion is reduced as a result of the curved guide thereof. In a non-supporting position, the support is recessed in the pull-out portion, which means that the support does not project to the side of or above or below the pull-out portion. In that embodiment of the invention also, it is possible to move the support outwards to the side during movement to the support position, in order to increase the diameter of the insertion opening beyond the width of the pull-out portion.

The support that moves upwards into the support position and the rotating support can each be provided separately or jointly on a beverage holder.

The curved guide of the pull-out portion is not necessarily in the form of an arc of a circle, but a preferred embodiment of the invention does provide an arcuate guide as slide guide for the pull-out portion. An arcuate guide enables sliding guidance of the pull-out portion, which is especially also arcuate, in an arcuate housing.

A preferred embodiment of the invention provides a mechanical drive for the support, which rotates the support as the pull-out portion is being extended and/or inserted. The mechanical drive is drive by the displacement movement of the pull-out portion. The drive may comprise a control curve mechanism for its drive.

In a further development of the invention, a pivot lever is provided as a component of the drive, which, on extension and/or insertion of the pull-out portion, is pivoted and engages with the rotatable support and as it pivots it rotates the support. The pivot lever is pivoted during extension and/or insertion of the pull-out portion by means of the control curve mechanism.

An embodiment of the invention provides a pivot bearing for the support on the pull-out portion in order to guide the support on the pull-out portion movably from the non-supporting position to the support position and vice versa. A development provides an oblique pivot axis of the pivot bearing. The pivot axis is so arranged that the support is pivoted both upwards and outwards to the side, relative to the pull-out portion, upon movement from the non-supporting position to the support position. As a result, both the support height in the rear region of the insertion opening is increased, in order to hold a beverage holder inserted in the insertion opening securely against tipping over, and the insertion opening is also increased. The widening of the insertion opening makes it possible to increase the diameter of the insertion opening beyond the width of the pull-out portion.

In a preferred construction, the beverage holder according to the invention comprises a mechanical drive for the support, which drive, on extension of the pull-out portion to the in-use position, moves the support upwards and optionally outwards to the side into the support position and/or, on insertion of the pull-out portion into the not-in-use position, moves the support downwards and optionally inwards into the non-supporting position in which it is recessed in the pull-out portion. The mechanical drive may comprise, for example, a spring element, which presses the support into the support position. On extension and insertion of the pull-out portion, the support slides, for example, along an edge of a housing in which the pull-out portion is displaceably guided, so that, on extension of the pull-out portion to the in-use position, the support moves to the support position and, on insertion of the pull-out portion, the support moves to the non-supporting position in which it is recessed in the pull-out portion, each of those movements of the support being actuated by a spring. That construction of the invention has the advantage that the support moves automatically.

A development of the invention provides two supports, each of which moves upwards and outwards to different sides in the support position. That construction of the invention enables greater widening of the insertion opening as a result of movement of the supports into the support position and thus a more narrowly constructed pull-out portion and beverage holder for a given diameter of the insertion opening.

In accordance with still a further feature of the present invention, the beverage holder in accordance with present invention has a pulled-out portion having an insertion opening for insertion of a beverage holder, a slide guide for guiding said pulled-out portion displaceably back and forth as a drawer between an inserted not-in-use position and an extended in-use position, said slide guide being a curved guide that displaceably guides said pulled-out portion at a start of an extension movement with a large vertical component and toward an end of the extension movement with an increasingly horizontal component; and means for damping the extension movement of the beverage holder such that damping increases towards an end of said extension movement of said pulled-out portion.

When the beverage holder is designed in accordance with the present invention it provides increasing damping of the pull-out portion towards the end of the extension movement. The damping can increase, for example, suddenly before the fully extended in-use position of the pull-out portion has been reached or continuously (progressively), linearly or nonlinearly over the entire extension movement or over a portion at the end of the extension movement.

The purpose of increasing damping at the end of the extension movement of the pull-out portion is as follows: as a result of the curved guide of the pull-out portion, the extension movement extends initially perpendicularly or steeply upwards and at the end of the extension movement extends flat or even horizontally. The effect of gravity counteracting the extension movement thus decreases during the extension movement of the pull-out portion, the pull-out portion accelerates at the end of the extension movement and, as a result, impacts abruptly at the end of the extension movement. The acceleration during extension of the pull-out portion is increased as a result of the fact that friction of the slide guide decreases during extension of the pull-out portion, since the guidance length over which the pull-out portion is guided displaceably decreases as extension progresses and consequently as the pull-out portion projects further, for example, from a housing of the beverage holder or from the dashboard of the motor vehicle. The damping that increases towards the end of the extension movement of the pull-out portion reduces or prevents violent contact of the pull-out portion at the end of its extension movement against an end stop or the like of the slide guide. The damping that increases towards the end of the extension movement of the pull-out portion can be provided on embodiments of the beverage holder according to the invention independently or jointly with the above-described rotatable support for a beverage holder inserted into the insertion opening of the pull-out portion.

In an embodiment of the invention, the damping that increases towards the end of the extension movement of the pull-out portion is achieved by means of a damping element that becomes effective only towards the end of the extension movement of the pull-out portion. This can be achieved, for example, by means of a toothed wheel of a damping element engaging a toothed rod only towards the end of the extension movement of the pull-out portion. It is also possible for the rotating movement of the rotatable support or for the pivoting of the pivot (ever that rotates the support to be dampened when the support is rotated only towards the end of the extension movement of the pull-out portion or when the pivot lever is pivoted only towards the end of the extension movement of the pull-out portion. Since the mechanical drive for rotating the support derives its movement from the displacement of the pull-out portion, the damping of the rotation of the support or of the pivot lever has an effect back on the extension movement of the pull-out portion and damps the extension movement of the pull-out portion at the end of the extension path. In addition to the damping element described, which becomes effective only towards the end of the extension movement of the pull-out portion, it is also possible to provide a damping element that damps the extension movement of the pull-out portion over its entire displacement path.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The beverage holder 10 according to the invention shown in the drawings is provided for installation in a dashboard of a motor vehicle (not shown). It has a housing 12 that is arcuate in a side view (FIG. 4) and a pull-out portion 14 that is also arcuate. The cross-section of the housing 12 is that of a square tube and the housing extends over an arc of about from 50 to 60°. The pull-out portion 14 has a rectangular cross-section and likewise extends over an arc of about from 50 to 60°. The housing 12 has lateral guide grooves 16 extending in the form of an arc, in which there lie displaceably arcuate guide rails 18 arranged on the side of the pull-out portion 14. The housing 12 forms an arcuate slide guide for the pull-out portion 14, which is guided displaceably in the manner of a drawer from a not-in-use position (not shown) inserted in the housing 12 to the extended in-use position shown in the drawing and vice versa. In a proposed site (visible in FIG. 4) for installation of the beverage holder 10, an arcuate displacement path of the pull-out portion 14, predetermined by the slide guide, extends from the not-in-use position inserted in the housing 12 upwards initially steeply, that is to say with a high vertical component. As a result of the arcuate guide, the direction of displacement flattens out over the extension path of the pull-out portion 14 increasingly in the direction of the horizontal.

The extension of the pull-out portion 14 to the in-use position is effected by spring actuation by means of a scroll spring 20. The scroll spring 20 is a flat spiral spring that winds up automatically owing to its resilience. The scroll spring 20 is thus a tension spring element. The coil of the scroll spring 20 is held rotatably in the rear region of the pull-out portion. The unrolled end 22 of the scroll spring 20 is fastened close to the front end of the housing 12 on the base thereof. As a result of its resilient tensile force, the scroll spring 20 displaces the pull-out portion 14 to the in-use position shown, in which it projects from the housing 12.

Figure 4:
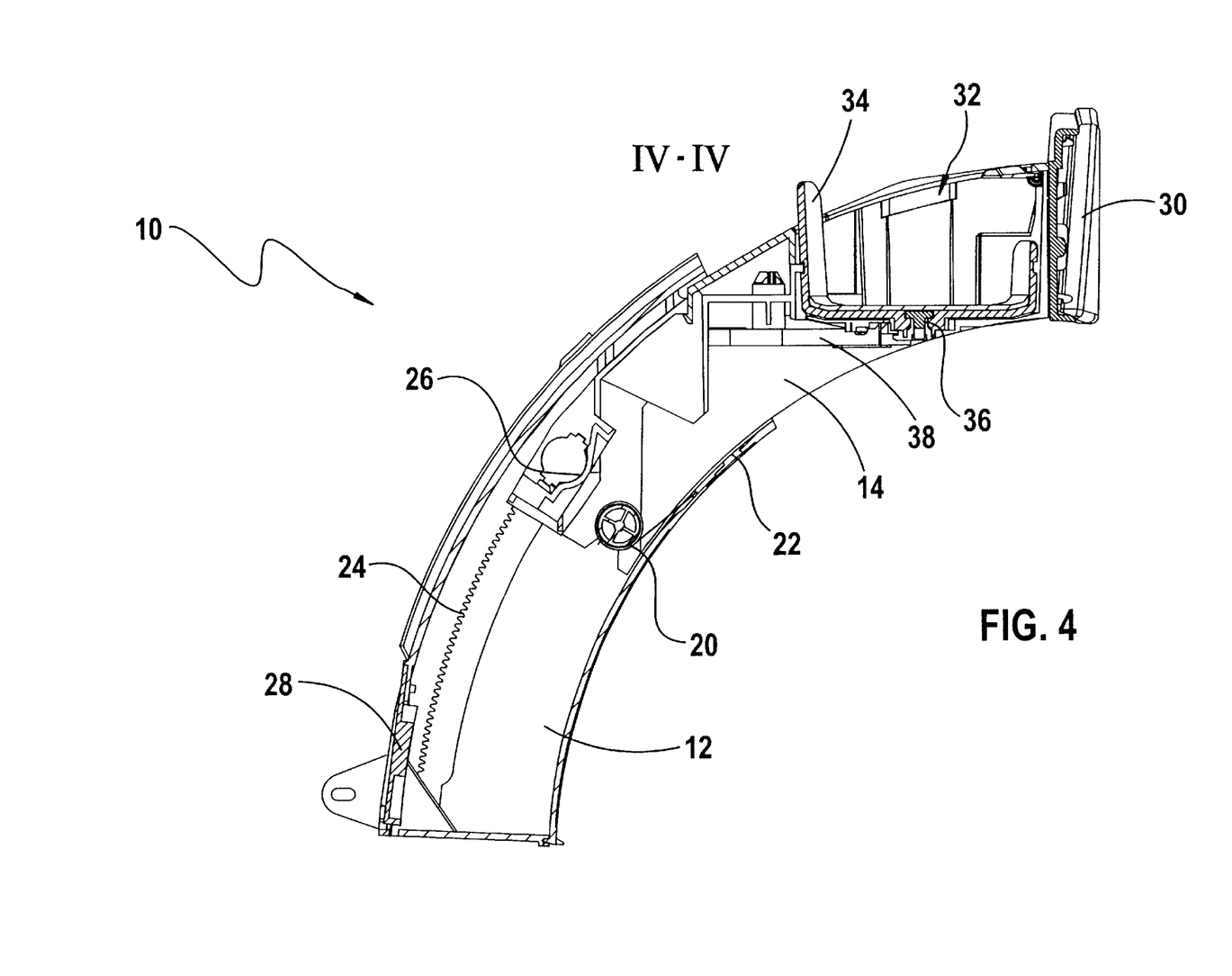
FIG. 4 is a longitudinal section of the beverage holder of FIG. 1 along line IV—IV in FIG. 3.

The extension movement of the pull-out portion 14 is dampened by a rotary damping element known per se, the toothed wheel of which meshes with a toothed rod 24 arranged in the form of an arc of a circle in a side wall of the housing 12. The rotary damper itself is not shown in the drawing for reasons of clarity; FIG. 4 merely shows an approximately circular opening 26 for insertion of the rotary damper in a side wall of the pull-out portion 14. In the basic position inserted into the housing 12, the pull-out portion 14 is held against the force of the scroll spring 20 by a so-called heart-shaped curved locking mechanism known per se. in the drawing, a pivot lever 28 of the heart-shaped curved mechanism can be seen. By means of a brief pressure from the front against a cover panel 30 of the pull-out portion 14 in the not-in-use position inserted in the housing 12, the heart-shaped curved locking mechanism is unlocked and the pulled-out portion 14 is extended by spring actuation to the in-use position shown.

In its front region projecting from the housing 12 in the in-use position in which it is extended out of the housing 12, the pull-out portion 14 has a cylindrical opening that forms an insertion opening 32 for the insertion of a beverage holder (not shown). Such a beverage holder may be, for example, a drinks can, a cup or a beaker. In the in-use position of the pull-out portion 14 forms part of the insertion opening 32 and is completed by a support 34 having a cylindrical side wall to form the complete insertion opening 32. The support 34 is arranged concentrically with the insertion opening 32. The support 34 has a rotation bearing 36 constructed in the form of a pin bearing, with which the support 34 is mounted to rotate in the insertion opening 32 about a notional axis of rotation coaxial with the insertion opening 32. In the in-use position of the pull-out portion 14 shown, the notional axis of rotation of the rotation bearing 36 extends vertically. In the position of rotation of the support 34 shown, the support projects upwards beyond the pull-out portion 14 in a rear region of the insertion opening 32. The purpose of the support 34 is to support a beverage holder inserted in the insertion opening 32 in the rear region of the insertion opening 32 at sufficient height to hold in the insertion opening 32 securely against tipping over. As a result of the arcuate construction of the pull-out portion 14, which is in turn determined by the arcuate slide guide, the depth of the insertion opening in the pull-out portion 14 in the rear region of the insertion opening 32 is, as can be seen in FIG. 4, reduced, and would not be sufficient to hold an inserted beverage holder reliably secured against tipping over. That is why the support 34 that projects upwards beyond the pull-out portion 14 in the shown position of rotation in the rear region of the insertion opening 32 is provided.

Figure 3:
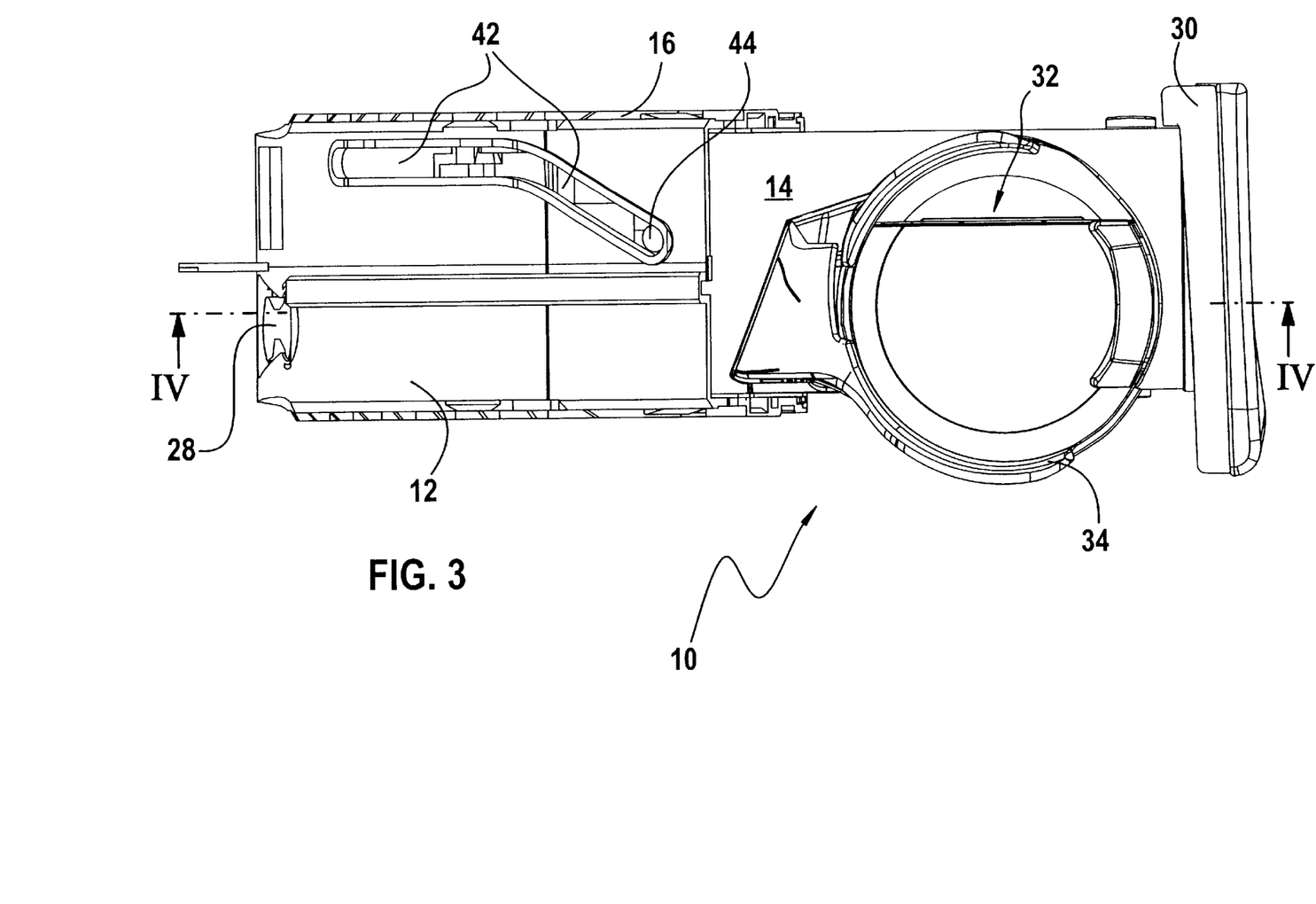
FIG. 3 is a plan view of the beverage holder of FIG. 1.

When not in use, the support 34 is rotated through about 180° (not shown), so that the support 34 is recessed in the pull-out portion 14 and the pull-out portion 14 can be inserted into the housing 12. As a result of the rotatable support 34, it is thus possible, given a predetermined depth of the insertion opening 32, to reduce the overall height of the drinks holder 10. Furthermore, the rotatable support 34 enables the diameter of the insertion opening 32 to be greater than the width of the pull-out portion 14 since, as can be seen especially in FIG. 3, in the position of rotation shown the support 34 projects on one side laterally beyond the pull-out portion 14. When the support 34 that is not in use is rotated through 180°, it is recessed, also in the lateral direction, completely in the pull-out portion 14, and thus does not project laterally beyond the pull-out portion 14.

Figure 2:
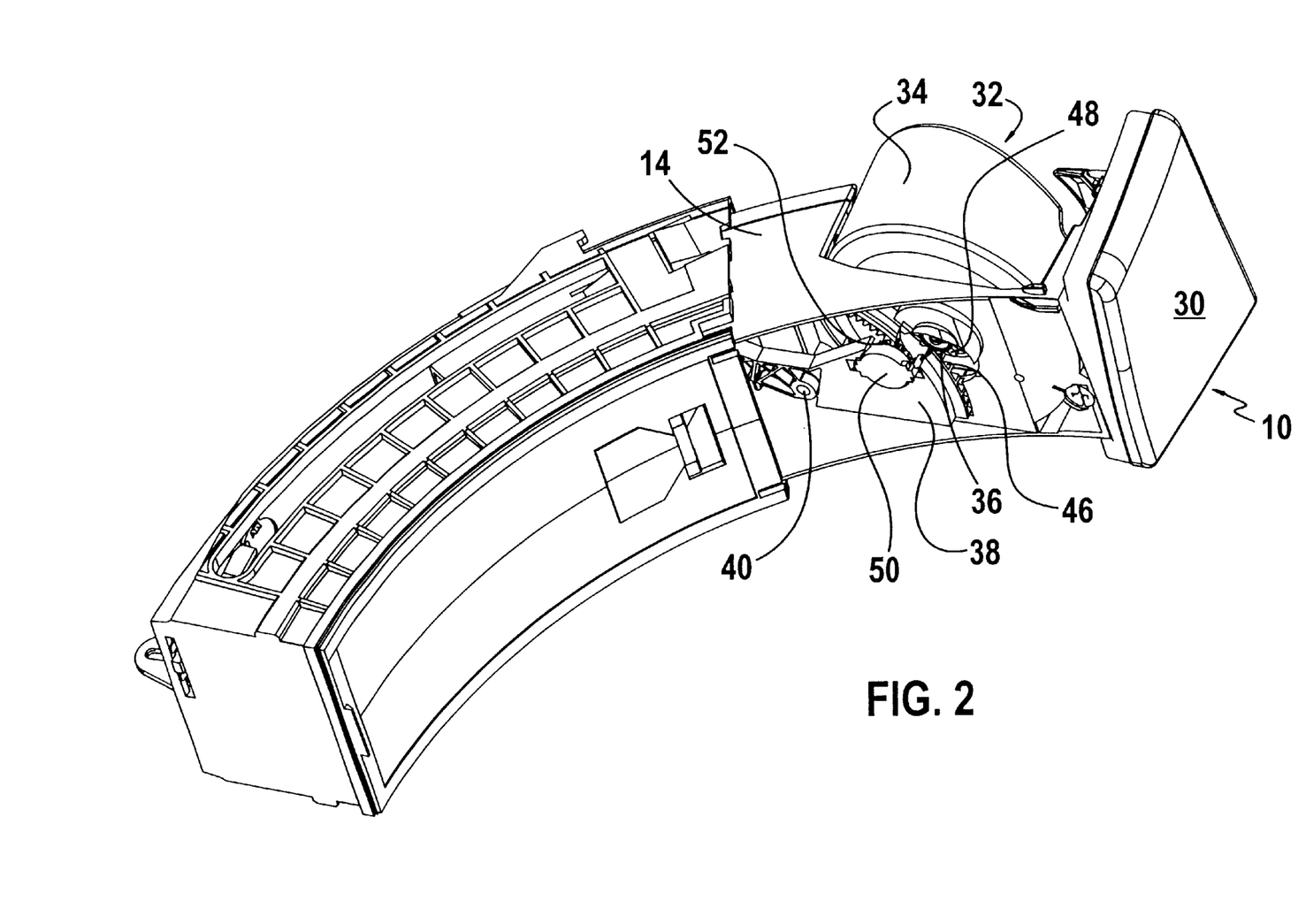
FIG. 2 is a perspective enlarged detail of the beverage holder of FIG. 1 viewed from below at an angle.

For rotation of the support 34, the drinks holder 10 according to the invention comprises a mechanical drive: the mechanical drive has a pivot lever 38 which is arranged on the underside of the pull-out portion 14 and is mounted on the pull-out portion 14 to pivot about a pin 40 (FIG. 2). The pivoting movement of the pivot lever 38 is derived from the displacement movement of the pull-out portion 14:to pivot the pivot lever 38, the mechanical drive has a control curve mechanism having a slideway 42 in which there lies displaceably a slideway pin 44, which projects upwards integrally from a rear end of the pivot lever 38 remote from the support 34. The slideway 42 extends in the direction of extension of the pull-out portion 14 initially parallel with the side walls of the housing 12 on one side of the housing 12. The slideway 42 then changes gradually into a portion that extends obliquely relative to the housing 12. On extension of the pull-out portion 14 out of the housing 12, the slideway pin 44 is displaced in the slideway 42. In the portion of the slideway 42 that extends obliquely relative to the housing 12, the slideway pin 44 is moved transverse to the pull-out portion 14 and, as a result, pivots the pivot lever 38. Toothing 46 on the front end of the pivot lever 38 facing the support 34, which toothing meshes with counter-toothing 48 of the support 34, rotates the support 34 through about 180°, during the prescribed pivoting of the pivot lever 38, to the position of rotation shown in the drawing. On insertion of the pull-out portion 14 into the housing 12, the pivot lever 38 rotates the support 34 back through 180° to a position of rotation not shown, in which the support 34 is recessed up and also sideways into the pull-out portion 14 and does not project.

Insert in the pull-out portion 14 is a rotary damper 50, the toothed wheel of which meshes with toothing 52 of the pivot lever 38. The rotary damper 50 damps the pivoting movement of the pivot lever 38. By means of the control curve mechanism 42, 44, which pivots the pivot lever 38 on displacement of the pull-out portion 14, the damping action of the rotary damper 50 has an effect back on the displacement of the pull-out portion 14, the rotary damper 50 also damps the displacement movement of the pull-out portion 14. Sine the pivot lever 38 as described is pivoted only towards the end of the extension movement of the pull-out portion 14, the rotary damper 50 also becomes effective only towards the end of the extension movement of the pull-out portion 14 and damps the extension movement just before the in-use position extended out of the housing 12 is reached. Damping of the displacement of the pull-out portion 14 at the end of the extension movement counteracts acceleration of the pull-out portion 14 upon extension, that acceleration being caused by the diminishing effect of gravity counteracting the extension movement, owing to the fact that the direction of extension of the pull-out portion 14 increasingly flattens out as a result of the curved guide. Moreover, friction of the slide guide of the pull-out portion 14 in the housing 12 on extension and as a result is guided in the housing 12 over a shortening guide length. This also results in acceleration of the extension movement of the pull-out portion 14 if the damping of the extension movement does not increase.

Figure 5:
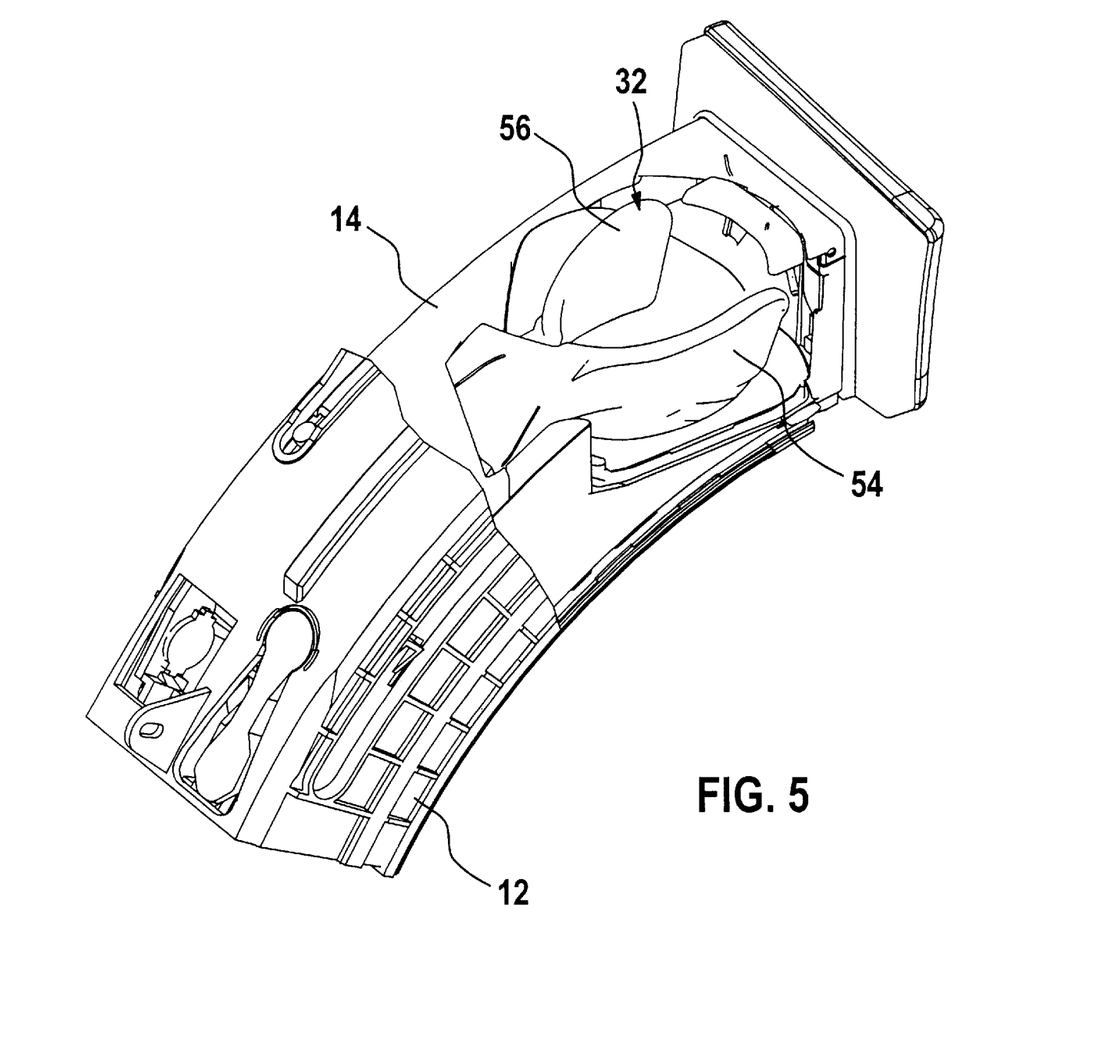
FIG. 5 shows a second embodiment of a beverage holder according to the invention in a view corresponding to that of FIG. 1.

The drinks holder 10 according to the invention shown in FIG. 5 has, in addition to the rotatable support 34 of the drinks holder 2 shown in FIGS. 1–4, supports 54, 56 that can be pivoted upwards and to the side, which will be explained hereinafter. Otherwise the drinks holder 10 shown in FIG. 5 is the same as that of FIGS. 1 to 4 and functions in the same manner. To avoid repetition, therefore, in respect of FIG. 5 reference is made to the above explanations given for FIGS. 1 to 4, and the same reference numerals are used for identical components.

Figure 1:
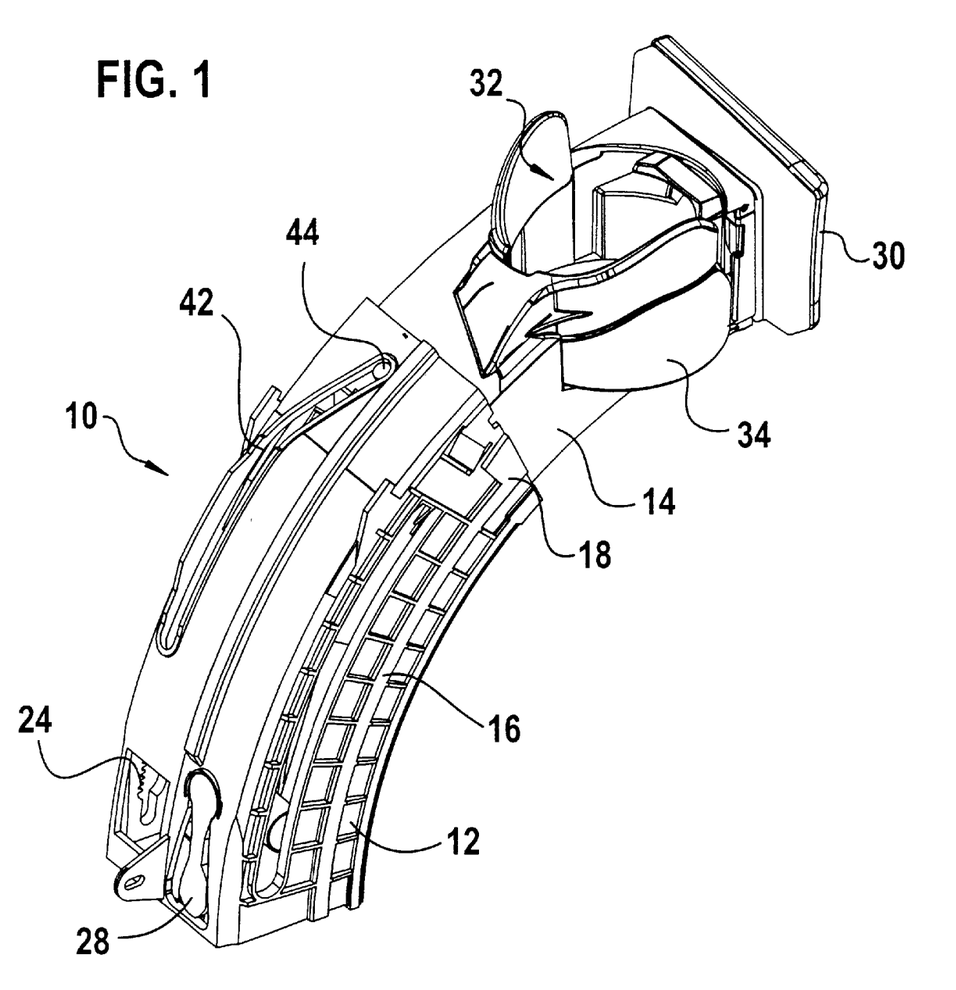
FIG. 1 is a perspective view of a beverage holder according to the invention viewed from above at an angle, with portions cut away.
Figure 6:
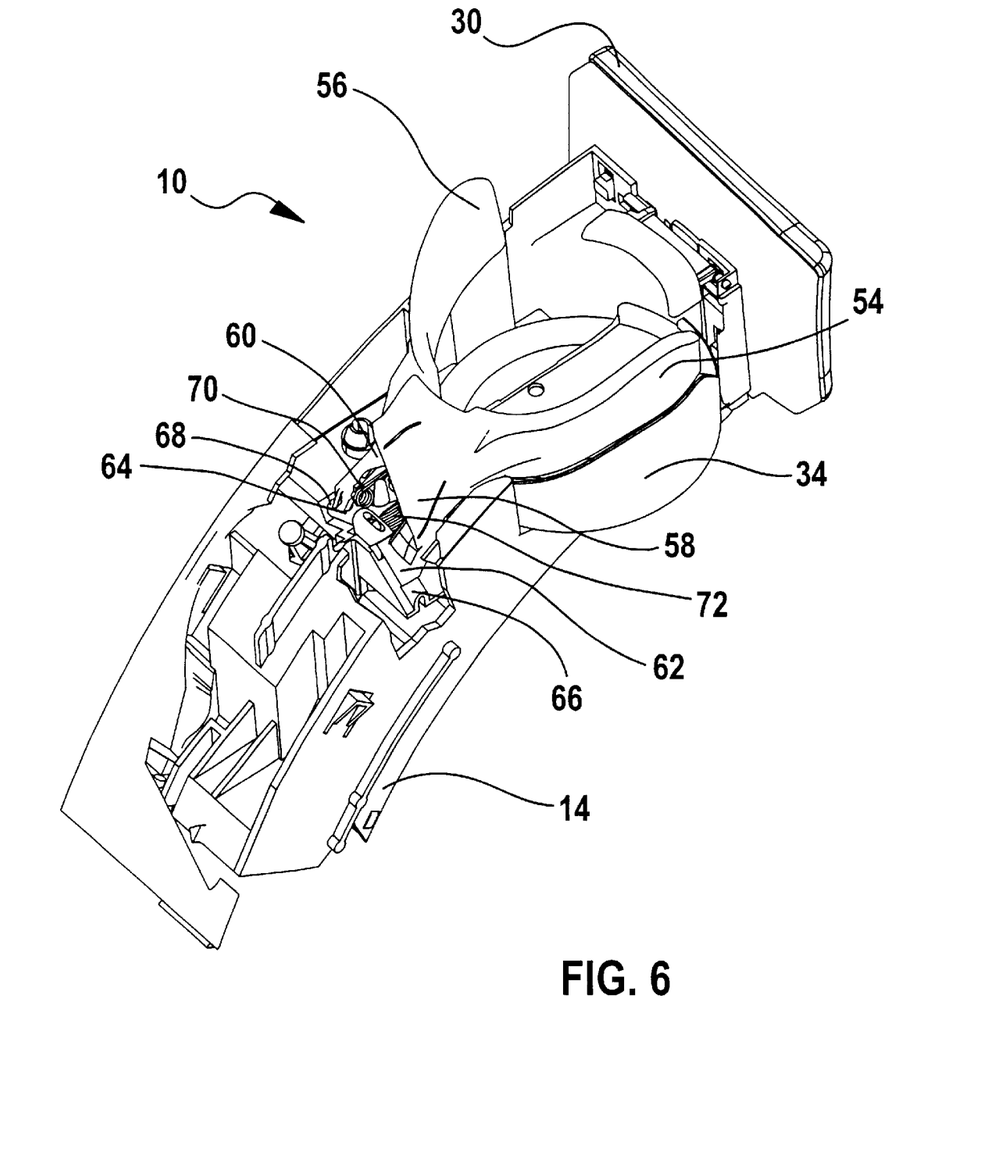
FIG. 6 is a detail of the beverage holder of FIG. 5, with portions cut away, in a view corresponding to that of FIG. 5.

As in FIG. 1, FIG. 5 shows the pull-out portion 14 in its in-use position extended out of the housing 12. The two supports 54, 56 are in a support position in a rear region of the insertion opening 32 above the pull-out portion 14. The two supports 54, 56 surround the insertion opening 32, in the support position, through about 180° in the rear region thereof. A beverage holder (not shown) inserted into the insertion opening 32 is thereby also supported in the rear region of the insertion opening 32 at a sufficient height to hold it securely against tipping over. Each of the two supports 54, 56 extends through about 90° in the peripheral direction of the insertion opening 32 in the left and right rear regions thereof, respectively. Each of the two supports 54, 56 has an arm 58, 60 that is integral therewith, which projects backwards from the respective support 54, 56. On their ends remote from the supports 54, 56, the arms 58, 60 have pivot shafts 62, 64 mounted pivotably in bearing brackets of the pull-out portion 14 (FIG. 6). Notional pivot axes of the supports 54, 56, defined by the pivot shafts 62, 64, are arranged obliquely in such a manner that the two supports 54, 56 can be pivoted inwards from the support position shown to a non-supporting position (not shown) obliquely downwards and inwards into the opening in the pul-out portion 14 that forms the insertion opening 32. In the non-supporting position, the two supports 54, 56 including their arms 58, 60 are recessed in the pull-out portion 14, that is to say that they do not project to the sides or upwards or downwards beyond the pull-out portion 14.

For pivoting from the non-supporting position to the support position, the supports 54, 56 have spring elements. Those spring elements are in the form of torsion leg springs 70, 72 and are mounted on the pivot shafts 62, 64 of the supports 54, 56. The leg springs 70, 72 are supported on the pull-out portion 14 and engage the arms 58, 60 of the supports 54, 56. The leg springs 70, 72 press the supports 54, 56 upwards and outwards into the support position.

On insertion of the pull-out portion 14 into the not-in-use position, the arms 58, 60 of the supports 54, 56 come to rest against an edge 74 of the housing 12 on the front open side thereof, from which the pull-out portion 14 extends upon displacement into the in-use position. On insertion of the pull-out portion 14 into the not-in-use position in the housing 12, the arms 58, 60 slide along the edge 74 of the housing 12 and are pressed downwards and inwards by the edge 74 against the force of the leg springs 70, 72 so that the supports 54, 56 pivot inwards into the opening in the pull-out portion 14 that forms the insertion opening 32. The supports 54, 56 are recessed in the pull-out portion 14 and are in the non-support position. On extension of the pull-out portion 14 into the in-use position, the leg springs 70, 72 pivot the supports 54, 56 into the support position. The leg springs 70, 72, the edge 74 of the housing 12 and the arms 58, 60 co-operating with the edge 74 form a mechanical drive for the supports 54, 56, which moves the supports 54, 56 into the support position on extension of the pull-out portion 14 into the in-use position, and moves the supports 54, 56 into the non-supporting position on insertion of the pull-out portion 14 into the not-in-use position.

The rotatable support 34 in the drinks holder 10 of FIG. 5 is lower than in the drinks holder 10 of FIG. 1 since, in the drinks holder 10 of FIG. 5, the supports 54, 56 that are arranged to be moved upwards and outwards into the support position extend the rotatable support 34 upwards.

It will be understood that each of the elements described above, or two or more together, may also find a useful application in other types of constructions differing from the types described above.

While the invention has been illustrated and described as embodied in beverage holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A beverage container, comprising a pulled-out portion having an insertion opening for insertion of a beverage container, a slide guide for guiding said pulled-out portion displaceably back and forth as a drawer between an inserted not-in-use position and an extended in-use position, said slide guide being a curved guide that displaceably guides said pulled-out portion at a start of an extension movement with a large vertical component and toward an end of the extension movement with an increasingly horizontal component; and means for damping the extension movement of the beverage container such that damping increases towards an end of said extension movement of said pulled-out portion.

2. A beverage container as defined in claim 1, wherein said slide for guiding said pull-out portion guide is an arcuate guide.

3. A beverage container as defined in claim 1; said damping means include a damping element that becomes effective only towards the end of said extension movement of the pulled-out portion.

4. A beverage holder, comprising a pull-out portion that has an insertion opening for insertion of a beverage container; a slide guide which guides said pull-out portion displaceable back and forth as a drawer between an inserted non-in-use position and an extended in-use position, said slide guide being formed as a curved guide that displaceably guides said pulled-out portion at a start of an extension movement with a large vertical component and toward an end of the extension movement with an increasingly horizontal component, said pull-out portion including a support having a rotation bearing for a beverage container inserted in said insertion opening, with an axis of rotation of said rotation beverage bearing having a position selected from a substantially vertical position and a substantially inclined position forward in a direction of extension when said pull-out portion has been extended; and a mechanical drive for said support, said mechanical drive deriving its movement from the extension of said pull-out portion and rotating said support on a movement selected from the group consisting of an extension and an insertion of said pull out portion, said drive having a control curve mechanism, said drive having a pivot lever that is mounted pivotably on said pull-out portion, is pivoted by said control curve mechanism and includes a toothing which rotates said support upon pivoting of said pivot lever.

5. A beverage holder as defined in claim 4, wherein said slide guide for guiding said pull-out portion is an arcuate guide.

6. A beverage container, comprising a pulled-out portion that has an insertion opening for insertion of a beverage container; a slide guide for guiding said pulled-out portion displaceably back and forth as a drawer between an inserted not-in-use position and an extended in-use position, said slide guide being a curved guide that displaceably guides said pulled-out portion at a start of an extension movement with a large vertical component and toward an end of said extension movement with an increasingly horizontal component, said pulled-out portion including a support that, in a support position, is located in a rear peripheral region of said insertion opening and above said pulled-out portion and is recessed in said pulled-out portion in a non-supporting position, said pulled-out portion including a support having a rotation bearing for a beverage container inserted in said insertion opening, with an axis of rotation of said rotation bearing being in a position selected from the group consisting of a substantially vertical position or inclined forward position in a direction of extension when said pulled-out portion has been extended; and a mechanical drive moving said support to a position selected from the group consisting of a supporting position upon extension of said pulled-out portion and a non-supporting position upon insertion of said pulled-out portion.

7. A beverage container as defined in claim 6, wherein said pulled-out portion has two supports.

8. A beverage container as defined in claim 6, wherein said slide guide for guiding said pull-out portion is an arcuate guide.

9. A beverage container as defined in claim 6; and further comprising a pivot bearing with which said support is mounted pivotably on said pulled-out portion.

10. A beverage container as defined in claim 9, wherein said pivot bearing has an obliquely arranged pivot axis, such that said support moves upwards obliquely and outwards to a side relative to said pulled-out portion, upon movement from a non-supporting position to a support position.

* * * * *